United States Patent
Schweikert et al.

[11] Patent Number: 5,975,656
[45] Date of Patent: Nov. 2, 1999

[54] UNIVERSAL WHEEL SLIP FORCE CONTROL LOGIC

[75] Inventors: David E. Schweikert, Moore; James A. Wood, Spartanburg, both of S.C.

[73] Assignee: Westinghouse Air Brake Company, Wilmerding, Pa.

[21] Appl. No.: 08/912,105

[22] Filed: Aug. 18, 1997

[51] Int. Cl.⁶ .................................................. B60T 7/12
[52] U.S. Cl. .......................................... 303/132; 303/174
[58] Field of Search ................................ 303/128, 123, 303/132, 191, 175, 174

[56] References Cited

U.S. PATENT DOCUMENTS

| | | | |
|---|---|---|---|
| 4,598,953 | 7/1986 | Wood et al. | 303/3 |
| 4,671,576 | 6/1987 | Fourie | 303/128 |
| 4,941,099 | 7/1990 | Wood et al. | 364/426.02 |
| 5,713,639 | 2/1998 | Doto et al. | 303/128 |
| 5,752,212 | 5/1998 | Wood et al. | 701/71 |

*Primary Examiner*—Robert J. Oberleitner
*Assistant Examiner*—Mariano Sy
*Attorney, Agent, or Firm*—James Ray & Associates

[57] ABSTRACT

A method in part enables a wheel slip control system that controls slip on a per axle basis to control slip on a per truck basis. The wheel slip control system issues on a per axle basis an axle reduction signal indicative of a percentage by which to reduce the braking force that would normally be applied to one wheel/axle combination on a truck of a rail vehicle. The method includes the step of converting the axle reduction signals issued on a per axle basis to a truck reduction priority signal indicative of a percentage by which to reduce the braking force on a per truck basis. For rail vehicles featuring dynamic braking equipment another step involves commanding the dynamic braking equipment to reduce the dynamic braking force being applied to the wheel/axle combinations of the truck in response to the percentage carried by the truck reduction priority signal. Still another step involves commanding the friction braking equipment to apply an appropriate amount of friction braking force to the wheel/axle combinations of the truck so as to resolve the slip experienced thereby. The appropriate amount of friction braking force represents the sum of the total braking force sought to be applied to the wheel/axle combinations of the truck less first a product of the total braking force and the percentage carried by the truck reduction priority signal and less second the dynamic braking force being applied to the wheel/axle combinations of the truck.

23 Claims, 2 Drawing Sheets

UNIVERSAL WHEEL SLIP FORCE CONTROL LOGIC

CROSS-REFERENCE TO RELATED APPLICATIONS

The present application is related to copending application Ser. No. 08/852,799, entitled WHEEL SLIP CONTROL PARAMETER VARIATION PROCESS, filed on May 7, 1997. The copending patent application is assigned to the assignee of the present invention, and its teachings are incorporated into the present document by reference.

FIELD OF THE INVENTION

The present invention generally relates to a process for controlling the slipping of wheels on a rail vehicle. More particularly, the present invention relates to a process for applying a wheel slip control system to many different types of rail vehicles whether the equipment on such rail vehicles applies braking force on a per axle, a per truck or even a per rail vehicle basis.

BACKGROUND OF THE INVENTION

There are a variety of wheel slip control systems whose construction and operation are known in the rail transport industry. The objective of such systems is to vary the force that the brakes apply to the wheels of the rail vehicle during braking so that the wheels neither slide nor lockup as they travel on the top surface of the railway track. By adjusting the force with which the brakes apply so as to prevent or at least reduce slipping, a brake control system can more safely and efficiently decelerate and stop a rail vehicle in a shorter distance than would be possible without the use of a wheel slip control system.

Wheel slip control systems essentially control the interaction between the wheels and the tracks on which they ride. The top surface of the rails on which the tread of the wheels ride is typically called the running surface. The wheel treads adhere to the running surface of the rails essentially by means of friction. Under any given set of operating conditions, there exists between a wheel tread and the running surface on which it rides a particular level of frictional adhesion. It is this friction between tread and running surface which allows the wheel treads to have traction on the rails as the vehicle travels along the tracks. Should the braking force applied to the wheels exceed that which can be sustained by the maximum amount of frictional adhesion inherent to the particular wheel tread-running surface environment at issue, the treads will no longer completely grip and thus slip, and maybe even slide, on the running surface. It is such slipping and sliding that wheel slip control systems attempt to eliminate or at least reduce.

The typical wheel slip control system in the art today employs one or more microprocessors accompanied by a requisite number of memory storage devices, and may be embodied within the brake control system. These memory devices may, of course, be either separate from or actually embodied in the microprocessor(s) (hereinafter "microprocessor"). The microprocessor executes a specific set of instructions contained in programming code. The programming code, according to whose directions or logic the wheel slip control system operates, is stored in these memory devices. The microprocessor and associated memory devices are typically housed within a single package referred to as the wheel slip controller. It is this controller that controls various other parts of the wheel slip control system as explained hereinafter.

The memory storage devices may also be used to store numerous tables of parameters or a number of individual parameters or both. These parameters are constants, with variable values, each of which preselected to work in connection with the circumstances of its application. In other words, these parameters, whether individually or as part of a table, are generally "setup" or "tuned" to each individual application. As the microprocessor executes the instructions contained in the programming code, the programming code generally requires the microprocessor to retrieve one or more of the parameter values from memory to complete a particular task. Exactly which value in a parameter table the microprocessor retrieves depends on the conditions under which the vehicle is then operating. The parameters along with the programming code are required by the microprocessor to operate the system. The parameter values serve as referents for determining other variables in the process through which to control slipping of the wheels.

As is known in the rail transport industry, a passenger transit rail vehicle may feature friction braking equipment only or a combination of friction and dynamic braking equipment. The total braking effort sought to be applied by its brake control system is generally communicated via a brake command signal to the brake control equipment on the vehicle. A typical wheel slip control system basically affects how the brake control system formulates the brake command signal so that the signal accommodates whatever amount of reduction is necessary to resolve the slipping problem.

Passenger transit vehicles typically have two axles per truck. Regarding those vehicles that feature only friction braking, the two axles on the truck typically have friction brake control equipment in common. The friction braking effort sought to be applied is communicated via the brake command signal or its progeny to the modulation valve(s) of the friction brake control equipment. One modulation valve is typically connected to the brake cylinder(s) or brake cylinder supply line(s) on each truck or even each axle depending on how the vehicle is configured. The modulation valve can be manipulated to vary the friction braking force applied to the wheel/axle combination(s). The modulation valve can generally be commanded to assume any one of several positions. When commanded to a release position, for example, the valve vents pressure from the brake cylinders so as to release the brakes. When commanded to lap position, the valve holds constant whatever pressure is currently in the brake cylinders. When commanded to an apply position, the modulation valve supplies pressure to the brake cylinders so as to reapply the brakes.

Regarding those passenger transit vehicles that feature both friction and dynamic braking, each axle on a truck also typically has its own AC motor through which it may be propelled and dynamically braked. The dynamic braking effort sought to be applied is communicated to a propulsion brake controller of the dynamic braking equipment. The propulsion brake controller can be manipulated to vary the dynamic braking force that the AC motors apply to the axles. The propulsion brake controller typically has per truck control over the two AC motors on its truck.

Wheel slip control systems ideally prevent or at least reduce slipping by detecting nascent slipping and then correcting accordingly the force applied by the brakes to the wheels of the rail vehicle. Simply described, after the wheel slip is detected, the wheel slip control system corrects (i.e., temporarily reduces) the braking force applied to the slipping wheel until the rotational speed of the wheel and its associated axle again matches the speed of the rail vehicle. Once the rotational speed of the wheel/axle combination matches or perhaps briefly exceeds the speed of the rail vehicle, the wheel slip control system reapplies the braking force to the wheel. This process of detecting and correcting wheel slip occurs rapidly and generally continuously on most all of the wheel slip control systems in the art.

Rather than using the aforementioned modulation valve, a wheel slip control system may employ a separate wheel slip control valve that functions in conjunction with the brake equipment. Depending on how the equipment is configured on the vehicle, the slip control valve may be connected to the brake cylinder(s) or brake cylinder supply line(s) on a per axle, per truck or per vehicle basis. The slip control valve on most systems is usually a solenoid valve capable of being commanded to assume any one of several positions. When commanded by the wheel slip controller to a release position, for example, the slip control valve vents pressure from the brake cylinders so as to release the brakes. When commanded to lap position, the valve holds constant whatever pressure is currently in the brake cylinders. When commanded to an apply position, the slip control valve supplies pressure to the brake cylinders so as to reapply the brakes.

The operation of a slip control valve in one type of wheel slip control system is described in U.S. Pat. No. 4,491,920, entitled RATE POLARITY SHIFT WHEEL-SLIP CONTROL SYSTEM. This patent is assigned to the assignee of the present invention, and incorporated by reference into this document. This particular system detects wheel slip by monitoring the rate at which each wheel/axle combination decelerates during braking. A rate determining circuit on each truck determines which wheel/axle combination on the truck exhibits the highest (most negative) rate of deceleration. When the rate of deceleration increases below a first predetermined (negative) threshold, the wheel slip controller commands the slip control valve to the release position thereby reducing the force applied by the brakes to the wheels of truck. This reduction in braking force allows the deceleration rate of the wheel/axle combination to change from being increasingly negative in value to decreasingly negative in value as the axle again approaches the speed of the vehicle. At this point, the rate of the wheel/axle combination, though still negative in value, is now moving positive in direction. The wheel/axle combination is thus accelerating so as to catch up to the speed of the vehicle. When the rate rises above a second predetermined (negative) threshold, the wheel slip controller commands the slip control valve to the lap position thereby maintaining whatever pressure is currently in the brake cylinders of the truck. Once the wheel/axle combination reaches the speed of the vehicle, its rate of change, though positive in value, is now again moving negative in direction because the vehicle has a negative acceleration due to the braking. When the speed of the axle matches that of the vehicle and its rate of change indeed moves in the negative direction, the wheel slip controller commands the slip control valve to the apply position thereby reapplying the brakes to the wheels of truck. Should wheel slip be detected again, the system will again correct it as noted above. It is through such detection and correction that the patented system continually address the problem of wheel slippage.

Many wheel slip control systems work in conjunction mostly with the friction brake control equipment, and merely remove dynamic braking until the wheel slipping problem has been corrected. For example, the slip control valve presented in U.S. Pat. No. 4,491,920, supra, can be commanded to the release, lap and reapply positions accordingly so as to correct the wheel slip that occurs during friction braking. Dynamic braking on the truck, though, may be addressed only to the extent that the propulsion brake controller controlling the AC motors is prevented from electrically braking the axles on the truck while the wheel slip is being corrected. Rail vehicles configured in this manner essentially have their wheel slip control systems alternately apply and release rapidly the friction brakes so that the affected wheel/axle combination experiences an averaged, reduced braking force.

Many other wheel slip control systems correct wheel slip by affecting the operation of both the friction and dynamic braking equipment on the truck. An example of such a wheel slip control system appears in U.S. Pat. No. 5,752,212, entitled PROPORTIONAL POLARITY WHEEL SLIDE PROTECTION. This application is assigned to the assignee of the present invention, and incorporated by reference into this document. This particular system allows the dynamic and friction brake systems to operate basically in harmony while wheel slip is being controlled. It incorporates into the overall brake control system so that the same modulation valve(s) used to modulate the braking force for normal vehicle braking will also be used to modulate the braking force during wheel slip control. Generally stated, this system enables the brake control system to derive a brake command signal through which the dynamic and friction brake equipment each reduce, proportionately, the braking force that each applies to the axles. It does this by taking into account data such as the speed and the acceleration/deceleration rate of the wheel/axle combinations, the severity of the wheel slip and the duration of the wheel slip. This system controls slip whether the vehicle is being decelerated using friction braking or a combination of dynamic and friction braking.

The wheel slip control system described in U.S. Pat. No. 4,941,099, entitled ELECTRONIC ADHESION ADAPTIVE WHEEL SLIDE PROTECTION ARRANGEMENT FUNCTION, is another example of a wheel slip control system that affects the operation of both the friction braking and the dynamic braking equipment on a truck. This patent is assigned to the assignee of the present invention, and incorporated by reference into this document. This particular system uses two detection circuits, a primary wheel slip detection circuit and a synchronous wheel slip detection circuit, each employing its own separate pattern recognition slip control logic. This system combines the separate slip control logic using a relatively complex scheme through which to correct slipping of the wheel/axle combination by modulating the force applied by the brakes to the affected wheel/axle combinations on the truck.

The wheel slip control system described in U.S. Pat. No. 4,941,099 employs detection and correction parameters through which it detects and subsequently corrects slipping of the wheel/axle combinations. Like in other wheel slip control systems in the art, the parameters used by this patented system are stored in memory devices either individually or in the form of tables or both. The detection and correction parameters are constants each of which generally preselected to work with the circumstances of the particular application for which it was intended.

There are many wheel slip control systems that employ such parameters according to principles known in the wheel slip control art. The detection parameters are used by the detection logic embodied in the programming code, whereas the correction parameters are used in the correction logic in the code. For example, as a microprocessor executes the instructions embodied in the programming code, the wheel slip controller monitors various input signals such as rotational speeds and the rates at which the wheel/axle combinations accelerate or decelerate. From these input signals and others, it may derive signals indicative of the vehicle speed, vehicle deceleration and other required information the nature of which depending on the particular wheel slip control system at issue. Based on such signals, the wheel slip controller retrieves the specific detection parameter(s) appropriate to the current operating conditions. Simply stated, the wheel slip controller uses the detection parameters in its detection logic when determining whether any of the wheel/axle combinations are actually experiencing slip. Once wheel slip is detected, the wheel slip controller retrieves the specific correction parameter(s) appropriate to the degree of slip experienced by the affected wheel/axle combination. It is these selected correction parameter(s) that the wheel slip controller uses in its correction logic so that the brake control system may derive a brake command signal through which to correct the slip, i.e., temporarily reduce the braking force applied to the slipping wheel until such slipping ceases or reduces to an acceptable level. The brake command signal or its progeny is sent to the brake control equipment or to the separate wheel slip control valve(s) to correct the slippage.

There are many different types of wheel slip control systems in use today in the rail transport industry and myriad ways in which to incorporate wheel slip control into a brake control system. The type of equipment that any given rail vehicle has and how that equipment may be configured varies from manufacturer to manufacturer and from application to application. For example, wheel slip control systems and brake control equipment have been devised that control braking force on a per axle, a per truck and even a per rail vehicle basis. One disadvantage known in the art is that due to so many equipment configurations there is little or no uniformity in the way in which braking force is controlled to reduce slipping of the wheel/axle combinations.

It is therefore desirable to introduce a measure of uniformity to the wheel slip control art to overcome this disadvantage. As explained in the detailed description section of this document, the present invention may be used to render existing wheel slip control systems capable of being used with brake control equipment whether such equipment is configured to control braking force on a per axle, per truck or per rail vehicle basis. The present invention may be used on rail vehicles whether they feature only friction braking equipment or a combination of friction and dynamic braking equipment. The present invention can achieve this advantage generally through modification of the logic embodied in the programming code executed by the wheel slip controllers/brake control systems on the market. The present invention may also, of course, be incorporated into newly devised systems.

There are other wheel slip control systems that, in whole or in part, relate to the present invention. One such system is described in U.S. Pat. No. 5,471,387, entitled METHOD OF AND APPARATUS FOR THE COMBINED DETECTION OF SPEED VARYING ENERGY LEVEL WHEEL SLIP DETECTION AND DETERMINATION OF WHEEL SLIP INTENSITY OF A RAILWAY VEHICLE BRAKE SYSTEM. Another system particularly relevant to the present invention is described in U.S. Pat. No. 5,654,889, entitled SIMPLIFIED PATTERN RECOGNITION WHEEL SLIDE PROTECTION. These two inventions are assigned to the assignee of the present invention, and are incorporated by reference into this document.

It should be noted that the foregoing background information is provided to assist the reader in understanding the present invention. Accordingly, any terms used herein are not intended to be limited to any particular narrow interpretation unless specifically stated otherwise in this document.

SUMMARY OF THE INVENTION

In one presently preferred embodiment, the present invention provides a method for enabling a wheel slip control system that controls slip on a per axle basis to control slip on a per truck basis. The wheel slip control system normally issues on a per axle basis an axle reduction signal indicative of a percentage by which to reduce the braking force that would typically be applied to one wheel/axle combination on a truck of a rail vehicle. The method includes the step of converting the axle reduction signals issued on a per axle basis to a truck reduction priority signal indicative of a percentage by which to reduce the braking force on a per truck basis. For rail vehicles featuring dynamic braking equipment another step involves commanding the dynamic braking equipment to reduce the dynamic braking force being applied to the wheel/axle combinations of the truck in response to the percentage carried by the truck reduction priority signal. Still another step involves commanding the friction braking equipment to apply an appropriate amount of friction braking force to the wheel/axle combinations of the truck so as to resolve the slip experienced thereby. The appropriate amount of friction braking force represents the sum of the total braking force sought to be applied to the wheel/axle combinations of the truck less first a product of the total braking force and the percentage carried by the truck reduction priority signal and less second the dynamic braking force being applied to the wheel/axle combinations of the truck.

OBJECTIVES OF THE INVENTION

It is, therefore, a primary objective of the present invention to provide a process through which a wheel slip control system can be rendered capable of being used with brake control equipment whether such equipment is configured to control braking force on a per axle, a per truck or even a per rail vehicle basis.

Another objective of the present invention is to provide a process through which a wheel slip control system may be used on rail vehicles whether they feature only friction braking equipment or a combination of friction and dynamic braking equipment.

Yet another objective of the present invention is to provide a process that can be implemented through simple modification of programming code through which a brake control system can formulate a brake command signal that accommodates whatever reduction in braking force is necessary to correct slipping of the wheel/axle combination(s) on a rail vehicle.

Still another objective of the present invention is to provide a process through which a wheel slip control system can decelerate and stop a rail vehicle more efficiently in a shorter distance than would be possible using prior art systems.

In addition to the objectives and advantages listed above, various other objectives and advantages of the present invention will become more readily apparent to persons skilled in the relevant art from a reading of the detailed description section of this document. The other objectives and advantages will become particularly apparent when the detailed description is considered along with the attached drawings and with the appended claims.

DETAILED DESCRIPTION OF THE INVENTION

Before describing the present invention in detail, the reader is advised that, for the sake of clarity and ease of understanding, the invention is described in the ensuing text as if incorporated into a passenger transit rail vehicle. Such a rail vehicle may feature friction braking equipment only or a combination of friction and dynamic braking equipment. The total braking effort sought to be applied by its brake control system is generally communicated via a brake command signal to the braking equipment on the rail vehicle.

The passenger transit vehicle will be considered to have two axles per truck. Regarding a vehicle that features only friction braking, the two axles on the truck will be considered to have friction brake control equipment in common. According to principles known in the art, the friction braking effort sought to be applied is communicated via the brake command signal and its progeny, a modulation valve control signal. Whether on a per axle, per truck or per vehicle basis, the friction braking effort sought is typically applied through the modulation valve of the friction brake control equipment. One modulation valve may be connected to a brake cylinder or a brake cylinder supply line on each truck or even each axle depending on how the vehicle is configured. Using the modulation valve control signal, the modulation valve can be manipulated to vary the friction braking force applied to the wheel/axle combination(s). As generally described in the background, the modulation valve can be commanded to assume any one of several positions including the release, lap and apply positions.

Regarding a passenger transit vehicle that features both friction and dynamic braking, each axle on a truck will be considered to have its own AC motor through which it may be propelled and dynamically braked. According to principles known in the art, the dynamic braking effort sought to be applied is communicated to a propulsion brake controller of the dynamic braking equipment. The propulsion brake controller can thus be manipulated to vary the dynamic braking force that the AC motors apply to the axles. The propulsion brake controller will be considered to have per truck control over the two AC motors on its truck.

It should be apparent from a reading of this document that the invention may be incorporated into other types of vehicles on which the cited equipment may be configured differently from what is described in this document. The present method is presented in this context not to limit the invention but merely to simplify the description, and consequently the understanding, of the invention.

Figure 1:
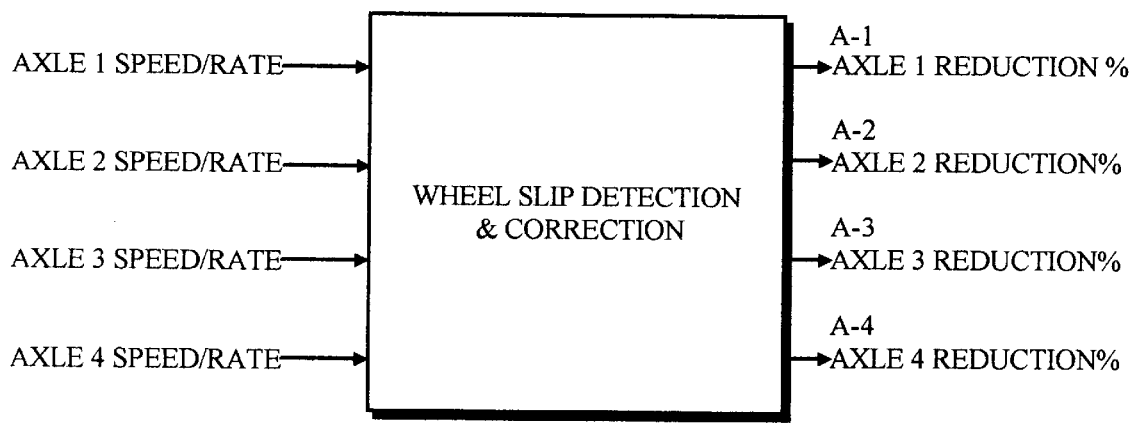
FIG. 1 is a block diagram that illustrates one of the many types of prior art wheel slip control systems with which the present invention may be employed.

Referring now to the drawings, FIG. 1 represents any one of numerous types of microprocessor based wheel slip control systems known in the brake control art. Such a system directs brake equipment with which it is used to reduce, proportionately, the braking force that is applied to one or more axles on an affected truck or, perhaps, to all axles on an affected vehicle. Whether the system controls the braking force on a per axle, per truck or per rail vehicle basis depends, of course, on how the equipment on the rail vehicle is configured.

It is generally well known how such wheel slip control systems reduce or even eliminate slippage of the wheel/axle combinations on a rail vehicle. A typical system typically takes into account data such as the speed and the acceleration/deceleration rate of the wheel/axle combinations. These inputs are represented by the Axle 1–4 speed/rate signals shown in FIG. 1. Simply stated, using these inputs and others along with specific values selected from tables of parameters based on the current operating conditions, the typical wheel slip control system calculates the amount by which to reduce the braking force on the affected axle(s) or truck(s) so as to eliminate or at least reduce slippage to an acceptable level.

The typical wheel slip control system commands a reduction in such braking force through the axle 1–4 reduction % signals illustrated in FIG. 1 in a manner known in the relevant art. It is through these reduction signals that the typical wheel slip control system affects how the overall system formulates the modulation valve control signal so that the signal accommodates whatever amount of reduction is necessary to resolve the slipping problem. It is with this type of wheel slip control system that the invention is generally designed to be used.

Figure 2:
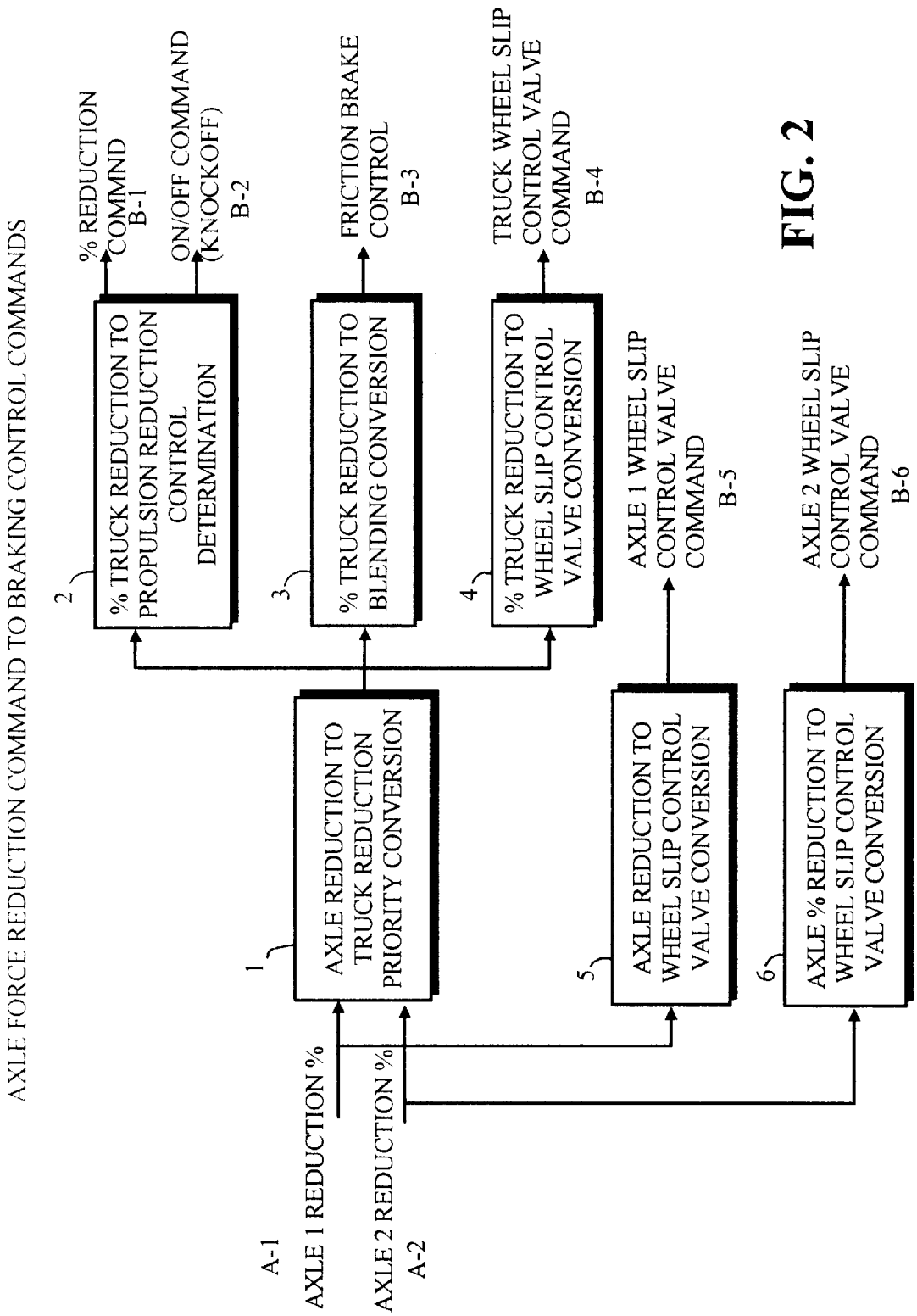
FIG. 2 is a block diagram that illustrates a method for improving the operation of a wheel slip control system including the prior art system represented by FIG. 1.

FIG. 1, as described previously, illustrates a wheel slip control system that can be used to reduce the braking force applied to each of the four axles of a rail vehicle. The present invention, illustrated in FIG. 2, provides a method for applying the axle reduction signals from a given wheel slip control system to a variety of rail vehicles. The exact way in which the axle reduction signals will be applied depends, however, on how the equipment on a given rail vehicle is configured. Though FIG. 2 illustrates how the present invention affects the braking effort on axles 1 and 2, it should be apparent from a reading of this document that the present invention will also normally be applied to axles 3 and 4 given the configuration suggested by FIG. 1. Specifically, for each block shown in FIG. 2 relating to the operation of axles 1 and 2, there would be another block representing the same function but pertaining instead to the operation of axles 3 and 4. The blocks pertaining to axles 3 and 4, however, are not illustrated for the sake of brevity.

A brake control system featuring the type of wheel slip control illustrated in FIG. 1 shall use the process steps of FIG. 2 in its programming code to address the problem of wheel slip. Regarding the invention as it applies to axles 1 and 2, Block 1 of FIG. 2 basically signifies the first step in the method of the present invention, at least on those brake control systems where per truck control is employed. This block uses signals from the wheel slip control system with which the present invention is to be used. These signals, referred to as axle 1 reduction % and axle 2 reduction % in FIG. 1, are the axle-1 and axle-2 reduction signals. It is through these signals that the wheel slip control system of FIG. 1 can command a reduction in the amount of braking force being applied by the braking equipment to the wheel/axle combinations A-1 and A-2.

The axle-1 reduction signal represents the command through which the wheel slip control system can reduce the braking force applied to wheel/axle combination A-1 by any percentage in the range from zero (no reduction in braking effort) to one hundred percent (full reduction in braking effort to the point that the brakes on axle-1 are released). Likewise, the axle-2 reduction signal represents the command through which the wheel slip control system can reduce the braking force applied to wheel/axle combination A-2 by any percentage in the range from zero to one hundred percent.

From FIG. 2 it should now be apparent that the present invention can be used with any wheel slip control system which outputs the aforementioned axle reduction signals. Moreover, the present invention could also be used with any wheel slip control system that has been retroactively modified to output the axle reduction signals. Such wheel slip control systems need only provide to the present invention the axle reduction signals for processing, beginning with the process step represented by Block 1 or with the process steps represented by Blocks 5 and 6 as explained infra.

Regarding the particular process step signified by Block 1, Block 1 basically represents a comparator device through which to compare the axle-1 reduction signal derived for axle 1 with the axle-2 reduction signal derived for axle 2. Its function is essentially to determine whether the reduction in braking effort sought for axle 1 via the axle-1 reduction signal is greater than the reduction in braking effort sought for axle 2 via the axle-2 reduction signal or vice versa. This comparison can be based on the difference in intensity or in the rate of change between the two axle reduction signals. The output of Block 1, hereinafter referred to as the truck reduction priority signal, will assume the value of whichever one of the two axle reduction signals has the highest priority as to need for reducing the braking force currently being applied to the wheel/axle combination that is exhibiting the most slip. The truck reduction priority signal thus represents the percentage by which the dynamic and friction braking effort on the truck is to be reduced.

The function of Block 1 can thus be generally represented by the following relationship:

IF AXLE-1 REDUCTION SIGNAL>AXLE-2 REDUCTION SIGNAL, THEN TRUCK REDUCTION PRIORITY SIGNAL=VALUE OF AXLE-1 REDUCTION SIGNAL.

IF AXLE-1 REDUCTION SIGNAL<AXLE-2 REDUCTION SIGNAL, THEN TRUCK REDUCTION PRIORITY SIGNAL=VALUE OF AXLE-2 REDUCTION SIGNAL.

The truck reduction priority signal represents the percentage by which to reduce the dynamic and friction braking effort currently applied to the wheel/axle combinations A-1 and A-2 on the truck. This value can range from zero to one hundred percent of whatever braking force is currently being applied to the wheel/axle combinations on the truck.

For rail vehicles that feature both dynamic and friction braking equipment, Blocks 2 and 3 signify the next steps in the method of the present invention. Block 2 is used to indicate how the dynamic braking equipment is affected by the present invention whereas Block 3 is used to indicative how the friction braking equipment is affected.

Regarding the dynamic braking effort currently being applied to the axles of the truck, Block 2 illustrates how the present invention can be used to affect operation of the propulsion brake controller of the dynamic braking equipment. The inputs to the Block 2 process step includes one signal, specifically, the truck reduction priority signal output from Block 1. The truck reduction priority signal represents the percentage by which the dynamic braking force currently applied to the axles A-1 and A-2 of the truck is to be reduced.

Block 2 essentially represents a conversion of the value of the truck reduction priority signal to a signal hereinafter referred to as the dynamic braking reduction signal.

The dynamic braking reduction signal can be manifested in either variable or logical form or both, again depending upon the exact type of dynamic braking equipment with which the invention will be used. The variable form of the dynamic braking reduction signal, represented by B-1 in FIG. 2, would, of course, be used with those propulsion brake controllers that can vary the amount of dynamic braking that can be delivered. When used with such a system, Block 2 represents a conversion of the value of the truck reduction priority signal to a variable dynamic braking reduction signal whose intensity is generally proportional to the percentage by which the dynamic braking effort is to be reduced on axles 1 and 2. According to known principles, the conversion may be made according to a ratio whose values are dependent upon the exact type of dynamic braking equipment with which the present invention will be used.

The variable dynamic braking reduction signal is provided to the propulsion brake controller to either reduce proportionately or even completely remove the dynamic braking effort applied to the axles of the truck. The signal is provided, of course, until such time as the slip is eliminated or at least reduced to an acceptable level. For example, when the variable signal exhibits no intensity, the propulsion brake controller enables full dynamic braking of the axles on the truck. When the variable signal exhibits full intensity, the propulsion brake controller completely removes or disables dynamic braking of the axles on the truck. Generally stated, the propulsion brake controller will alter the dynamic braking effort according to the intensity of the variable dynamic braking reduction signal it receives. The variable dynamic braking reduction signal is essentially another factor taken into account by the propulsion brake controller to determine the net amount of dynamic braking force to be applied by the AC motors to axles 1 and 2 of the truck.

The logical form of the dynamic braking reduction signal, represented by B-2 in FIG. 2, would, of course, be used with those propulsion brake controllers that employ an on/off approach in controlling dynamic braking. When used with such on/off system, Block 2 represents a conversion of the value of the truck reduction priority signal to a logical dynamic braking reduction signal. The logical dynamic braking reduction signal may thus assume any one of two distinct states.

Which state the logical dynamic braking reduction signal assumes will generally depend on the percentage by which the wheel slip control system seeks to reduce the dynamic braking effort applied to axles 1 and 2. As noted previously, the truck reduction priority signal output from Block 1 will assume the value of whichever one of the two axle reduction signals indicates the greatest need for reducing the braking force. The truck reduction priority signal thus represents the percentage by which the dynamic braking effort is to be reduced on axles 1 and 2 of the truck. So, for example, if the percentage remains below a predetermined threshold value, the logical dynamic braking reduction signal remains in the enabling state. Conversely, when this percentage reaches or exceeds the predetermined threshold value, the logical dynamic braking reduction signal assumes the disabling state. The predetermined threshold value is tunable and ultimately dependent on how the cited equipment and the vehicle are configured as well as on the conditions under which they operate.

The logical dynamic braking reduction signal is thus provided to the propulsion brake controller to completely remove the dynamic braking effort applied to the axles of the truck until such time as the slip is eliminated or at least reduced to an acceptable level. For example, when the logical dynamic braking reduction signal assumes the enabling state, the propulsion brake controller enables dynamic braking of axles 1 and 2 on the truck. Conversely, when the logical dynamic braking reduction signal assumes the disabling state, the propulsion brake controller disables dynamic braking of the axles on the truck until the slipping problem is resolved. The propulsion brake controller allows this disabling reduction signal to take precedence over the dynamic braking effort that would normally be applied as long as the percentage carried by the truck reduction priority signal remains at or exceeds the predetermined threshold value.

The process step represented by Block 2 allows the present invention to be used with propulsion/dynamic brake control systems that employ a variable approach or an on/off approach in controlling dynamic braking or even both approaches. With the latter, the process step of Block 2 allows a complete disabling of dynamic braking during wheel slip. This type of on/off control, of course, is generally used only when attempting to control very severe slipping of the wheels. With the former, the process step of Block 2 permits a varying of the dynamic braking from, for example, a modest reduction in the dynamic braking effort on the axles in response to minor slipping or, if need be, a complete reduction in dynamic braking in response to severe slipping of the wheel/axle combinations.

Regarding the friction braking effort currently being applied to the wheel/axle combinations of the truck, Block 3 illustrates how the present invention can be used to affect the operation of the modulation valve of the friction braking equipment. The inputs used by the Block 3 process step include the truck reduction priority signal output from Block 1 and the brake command signal. The truck reduction priority signal, of course, represents the percentage by which the current friction braking effort on the wheel/axle combinations of the truck is to be reduced. As is known in the relevant art, the total braking effort sought by the brake control system is communicated in the form of the brake command signal. The brake equipment on each rail vehicle applies the brakes according to the dictates of the particular brake command signal received. It is also well known that the total braking effort sought is often formulated to take into account the weight of the load borne by the rail vehicle through a process generally known as load compensation. For rail vehicles that feature only friction braking equipment, the total braking effort sought comprises only a friction braking force component. For rail vehicles that feature both dynamic and friction braking equipment, the total braking effort sought may include a friction braking force component as well as a dynamic braking force component. It is well known that, in a process referred to as blending, if the dynamic braking force to be applied does not amount to one hundred percent of the total braking effort sought then friction braking force will be added to the dynamic braking force to make up the deficit in the total braking force sought.

Block 3 signifies the process step through which the total braking effort sought is reduced by the percentage represented by the truck reduction priority signal. The total braking effort sought should preferably, though not required to be, load compensated prior to this step. Likewise, the total braking effort should be reduced by the aforementioned percentage before the friction and dynamic braking forces have been blended. By reducing the total braking effort by the aforementioned percentage before blending of dynamic and friction braking, the friction braking effort will be reduced accordingly. Implementing this process step in this manner also enables the slip on the truck to be corrected according to the standard brake control algorithms already embodied within the programming code of the system.

Moreover, as is apparent from FIG. 2, whether or not the rail vehicle features dynamic braking equipment, the function of Block 3 can thus be generally represented by the following relationship:

MODULATION VALVE CONTROL SIGNAL=TOTAL BRAKING EFFORT−TOTAL BRAKING EFFORT * TRUCK REDUCTION PRIORITY SIGNAL− DYNAMIC BRAKING EFFORT

The output of Block 3, represented by B-3 in FIG. 2, is referred to as the modulation valve control signal. The process step of Block 3 essentially takes whatever friction braking force is being applied and reduces it by the aforementioned percentage. In other words, the modulation valve control signal represents the amount of friction braking force currently being applied to the truck less the percentage by which the braking force should be reduced to correct the wheel slip. Whatever friction braking force remains from this calculation is conveyed in the form of the modulation valve control signal to the modulation valve that controls friction braking on the truck. Depending on the particular modulation valve control signal received, the modulation valve will be commanded to assume one of the aforementioned positions in a manner well known in the art. The output of Block 3, of course, could be adapted to control a wide variety of valves. It is for the sake of brevity that they are referred to herein as the modulation valve.

By implementing the Block 3 process step before the blending of the dynamic and friction braking forces, the slipping of the wheels can be controlled thereafter generally according to standard brake control algorithms already embodied within the programming code of the system. Generally stated, the process steps represented by Blocks 1 and 3 enable the overall system to take into account the cited percentage in deriving the modulation valve control signal. It is through this signal that the wheel slip control system can command a reduction in the amount of braking force being applied to the wheel/axle combinations A-1 and A-2 of the affected truck.

Summarizing the functions performed by Blocks 1, 2 and 3, the axle-1 and axle-2 reduction signals are each derived by a wheel slip control system to reduce the braking force applied to only one wheel/axle combination, i.e., on a per axle basis. Through the process step represented by Block 1, the axle-1 and axle-2 reduction signals are essentially converted to a single signal—the truck reduction priority signal. The process step represented by Block 3 allows the brake control system to use that single signal to reduce the braking force on a per truck basis. The modulation valve control signal output from Block 3 implements the reduction of friction braking force on a per truck basis. The modulation valve signal is the output produced by brake control algorithms as modified with the aforementioned process steps embodied within the programming code of the system. Through Blocks 1 and 3, the present method allows a brake control system originally designed to control wheel slip on a per axle basis to control such wheel slip instead on a per truck basis. The process step represented by Block 2, of course, can be implemented along with Blocks 1 and 3 on those vehicles that feature dynamic braking equipment.

Regarding those rail vehicles in which wheel slip is controlled not through the modulation valve of the friction braking equipment but through a separate valve altogether, Block 4 illustrates how the present invention can be used to affect the operation of a wheel slip control valve. This valve operates only in conjunction with the wheel slip control system and typically does so on a per truck basis. Unlike Block 3, this process step works generally independent of the brake command signal. Like Blocks 2 and 3, the process step of Block 4 uses the truck reduction priority signal. This truck reduction priority signal again represents the percentage by which the current braking effort is to be reduced on the wheel/axle combinations A-1 and A-2 of the truck.

Block 4 basically represents the performance of two separate yet related functions: a monitoring function and a table look-up and signal output function. Regarding its monitoring function, the Block 4 process step monitors the rate at which the truck reduction priority signal changes in value over successive cycles. Specifically, the percentage carried by the truck reduction priority signal is monitored to determine whether the rate at which it changes is increasing or decreasing. If the rate at which the percentage changes is increasing, this indicates that the state of the wheel slip control valve should be changed to the release, release pulse or lap state. Exactly which of those three states the valve should assume depends on how much the rate has increased. Similarly, if the rate at which the percentage changes is decreasing, the state of the wheel slip control valve should be changed to the apply, apply pulse or lap state. Again, exactly which of those three states the wheel slip control valve should assume depends on how much the rate has decreased over successive monitoring cycles.

Regarding its table look-up and signal output function, the Block 4 process step also signifies a table of parameters whose values are generally "setup" or "tuned" to the particular application with which the present invention is to be used. Each value in the table essentially represents a particular state to which to command the wheel slip control valve. Each value thus generally corresponds to a particular rate of change in the percentage carried by the truck reduction priority signal. Depending on the particular rate of change in the truck reduction priority signal, Block 4 indicates that the wheel slip control valve will be commanded to assume the operational state corresponding to that particular rate of change.

The output of Block 4, represented by B-4 in FIG. 2, can thus be used to control the wheel slip control valve of the wheel slip control system on a per truck basis. Through B-4, hereinafter referred to as the truck slip control signal, the wheel slip control valve can be commanded to assume any one of the aforementioned positions independent of the modulation valve of the friction braking equipment. When commanded to a release position, for example, the slip control valve vents pressure from the brake cylinders so as to release the brakes on the truck. When commanded to lap position, the valve holds constant whatever pressure is currently in the brake cylinders. When commanded to an apply position, the slip control valve supplies pressure to the cylinders so as to reapply the brakes on the truck. Whatever state to which the valve is commanded, it enables the friction braking equipment to apply friction braking force in the amount necessary to resolve slipping of the wheel/axle combinations of the truck.

It should be apparent that the process step of Block 4 can be performed in conjunction with the steps represented by Blocks 2 and 3. Regarding those vehicles that feature only friction braking, Block 4 would be implemented only with Block 3, as Block 2 relates only to dynamic braking. Regarding those vehicles that feature both friction and dynamic braking, Block 4 would be implemented with Blocks 2 and 3. For those vehicles in which wheel slip is controlled on a per truck basis not through the modulation valve of the friction braking equipment but through a separate wheel slip control valve altogether, Block 4 would be implemented with Block 2. Block 4 could also be implemented for purposes of backing up the operation of Blocks 2 and 3.

Many rail vehicles feature equipment through which wheel slip is controlled on a per truck basis using a separate wheel slip control valve for each truck. For this reason, the present invention includes the process step represented by Block 4 described above. Other rail vehicles feature equipment through which wheel slip is controlled on a per axle basis using a separate wheel slip control valve for each axle. For this reason, the present invention includes the following process steps represented by Blocks 5 and 6.

Block 5 and 6 each illustrate how the present invention can be used with a wheel slip control valve that controls wheel slip only on a Per axle basis. Therefore, unlike Block 4, neither Block 5 nor Block 6 receive the truck reduction priority signal because such signal is used to control braking force applied not on a per axle basis but on a per truck basis. Consequently, Blocks 5 and 6 receive, respectively, the axle-1 and axle-2 reduction signals directly from the wheel slip control system with which the present invention is used. The axle-1 reduction signal carries to Block 5 the command through which the wheel slip control system can reduce the braking force applied to wheel/axle combination A-1 by any percentage in the range from zero to one hundred percent. Likewise, the axle-2 reduction signal carries to Block 6 the command through which the wheel slip control system can reduce the braking force applied to wheel/axle combination A-2 by any percentage in the range from zero to one hundred percent.

Regarding the particular process steps signified by Blocks 5 and 6, each block basically represents the performance of two separate yet related functions: a monitoring function and a table look-up and signal output function similar to the functions of Block 4. Regarding the monitoring function of Block 5, for example, the Block 5 process step monitors the rate at which the axle-1 reduction signal changes in value over successive cycles. Specifically, the percentage carried by the axle-1 reduction signal is monitored to determine whether the rate at which it changes is increasing or decreasing. If the rate at which the percentage changes is increasing, this indicates that the state of the wheel slip control valve corresponding to axle-1 should be changed to the release, release pulse or lap state. Exactly which of those three states the valve should assume depends on how much the rate has increased over successive monitoring cycles. Similarly, if the rate at which the percentage changes is decreasing, -the state of that axle-1 valve should be changed to the apply, apply pulse or lap state. Again, exactly which of those three states the valve should assume depends on how much the rate has decreased over successive cycles in monitoring the percentage carried by the axle-1 reduction signal. Block 6 performs basically the same monitoring function as Block 5, except with the axle-2 reduction signal as it relates to the operation of the axle-2 wheel slip control valve.

Regarding the table look-up and signal output function of Block 5, Block 5 also signifies a table of parameters whose values are generally "setup" or "tuned" to the particular application with which they shall be used. Each value in the table essentially represents a particular state to which to command the axle-1 wheel slip control valve. Each value corresponds to a particular rate of change in the percentage carried by the axle-1 reduction signal. Depending on the particular rate of change in the axle-1 reduction signal, Block 5 indicates that the axle-1 wheel slip control valve will be commanded to assume the operational state corresponding to that particular rate of change. Block 6, of course, performs the same table look-up and signal output function as Block 5, except with the axle-2 reduction signal as it relates to the operation of the axle-2 wheel slip control valve.

The outputs from the process steps of Blocks 5 and 6, represented by B-5 and B-6 in FIG. 2, can thus be used to control the wheel slip control valves respectively corresponding to axle-1 and axle-2 of the truck. Through B-5 and B-6, hereinafter referred to as the axle-1 and axle-2 slip control signals, the axle-1 and axle-2 wheel slip control valves can be commanded to assume any one of the aforementioned positions independent of the modulation valve(s) of the friction braking equipment on that truck. When commanded to a release position, for example, the axle-1 slip control valve vents pressure from the brake cylinder so as to release the brakes on the wheel/axle combination A-1. When commanded to lap position, that valve holds constant whatever pressure is currently in the brake cylinder. When commanded to an apply position, the axle-1 slip control valve supplies pressure to the brake cylinder so as to reapply the brakes on the wheel/axle combination A-1. Whatever state to which such a valve is commanded, it enables the braking equipment to apply friction braking force in the requisite amount to resolve slipping of its corresponding wheel/axle combination.

It should be apparent that the process steps of Blocks 5 and 6 can be performed in conjunction with the steps represented by Blocks 2 and 3. Regarding those vehicles that feature only friction braking equipment, Blocks 5 and 6 would be implemented only with Block 3, as Block 2 relates only to dynamic braking. Regarding those vehicles that feature both friction and dynamic braking equipment, Blocks 5 and 6 would be implemented with Blocks 2 and 3. For those vehicles in which wheel slip is controlled on a per axle basis not through the modulation valve(s) of the friction braking equipment but through separate wheel slip control valves altogether, Blocks 5 and 6 would be implemented with Block 2. Blocks 5 and 6 could also be implemented for purposes of backing up the operation of Blocks 2 and 3. Blocks 5 and 6 would not, of course, be implemented with Block 4 as the latter suggests control of braking and wheel slip on a per truck basis and the former suggests such control on a per axle basis.

It should be apparent that the present invention can be applied to older, current and future generations of wheel slip control systems. As evidenced by Blocks 3, 4, 5 and 6, the present invention may be used to render an existing wheel slip control system capable of being used with brake control equipment whether such equipment is configured to control braking force on a per axle, a per truck or even a per rail vehicle basis. As evidenced by Block 2, the present invention may also be used on rail vehicles that feature dynamic braking equipment. Whatever the application, the appropriate process steps can be implemented in the form of new logic embodied in the programming code executed by a brake control system that features the type of wheel slip control described in this document. Obvious modifications may be necessary, of course, depending on the type of system with which the present invention will be used.

The presently preferred embodiments for carrying out the invention have now been set forth according to the Patent Act. Those persons of ordinary skill in the art to which this invention pertains may nevertheless recognize various alternative ways of practicing the invention without departing from the spirit and scope of the appended claims. Those of such skill will also recognize that the foregoing description is merely illustrative and not intended to limit any of the following claims to any particular narrow interpretation.

Accordingly, to promote the progress of science and the useful arts, we secure for ourselves by Letters Patent exclusive rights to all subject matter embraced by the following claims for the time prescribed by the Patent Act.

We claim:

1. A method for enabling a wheel slip control system that normally controls slip on a per axle basis to control slip on any one of a per axle basis and a per truck basis depending on type of braking equipment with which said method is used, said brake equipment including friction braking equipment and dynamic braking equipment, said wheel slip control system for issuing on a per axle basis an axle reduction signal indicative of a percentage by which to reduce braking force applied to a wheel/axle combination of a truck of a rail vehicle, said method comprising the steps of:

(a) converting said axle reduction signals issued on a per axle basis to a truck reduction priority signal indicative of a percentage by which to reduce said braking force on a per truck basis;

(b) commanding said dynamic braking equipment to reduce dynamic braking force being applied to said wheel/axle combinations of said truck in response to said percentage carried by said truck reduction priority signal, said dynamic braking equipment employing one of:

(i) an on/off control approach such that a logical dynamic braking reduction signal assumes (A) an enabling state by which to enable dynamic braking of said wheel/axle combinations of said truck if said percentage carried by said truck reduction signal remains below a predetermined threshold value and (B) a disabling state by which to disable dynamic braking of said wheel/axle combinations of said truck if said percentage carried by said truck reduction signal reaches or exceeds said predetermined threshold value; and (ii) a variable control approach such that said dynamic braking force can range from being applied fully in response to a variable dynamic braking reduction signal having minimum intensity to being released fully in response to said variable dynamic braking reduction signal having maximum intensity; and (c) commanding said friction braking equipment to apply an appropriate amount of friction braking force to said wheel/axle combinations of said truck so as to resolve said slip experienced thereby such that said appropriate amount of friction braking force represents a sum of total braking force sought to be applied to said wheel/axle combinations of said truck less first a product of said total braking force and said percentage carried by said truck reduction priority signal and less second said dynamic braking force being applied by said dynamic braking equipment to said wheel/axle combinations of said truck.

2. The method as recited in claim 1 further including the steps of:

(a) monitoring said truck reduction priority signal over successive monitoring cycles to determine a rate at which said truck reduction priority signal changes;

(b) selecting from a table of wheel slip control values a valve position value corresponding to said rate of change detected over most recent of said successive monitoring cycles; and (c) commanding a backup wheel slip control valve to assume a particular position corresponding to said valve position value so selected thereby directing said backup wheel slip control valve to change pressure within a brake cylinder of said friction braking equipment so that said friction braking equipment applies said appropriate amount of friction braking force to said wheel/axle combinations of said truck should said method otherwise fail to so direct said friction braking equipment to so apply said appropriate amount of friction braking force.

3. The method as recited in claim 1 further including for each of said axle reduction signals the steps of:

(a) monitoring said axle reduction signal over successive monitoring cycles to determine a rate at which said axle reduction signal changes;

(b) selecting from a table of wheel slip control values a valve position value corresponding to said rate of change detected over most recent of said successive monitoring cycles; and (c) commanding a backup wheel slip control valve to assume a particular position corresponding to said valve position value so selected thereby directing said backup wheel slip control valve to change pressure within a brake cylinder of said friction braking equipment for said wheel/axle combination so that said friction braking equipment applies said appropriate amount of friction braking force to said wheel/axle combination should said method otherwise fail to so direct said friction braking equipment to so apply said appropriate amount of friction braking force.

4. The method as recited in claim 1 wherein said truck reduction priority signal assumes through said converting step said percentage carried by whichever one of said axle reduction signals has greatest priority as to need for reducing said braking force currently being applied on a per axle basis.

5. The method as recited in claim 1 wherein said total braking force used in said commanding step is first formulated to take into account weight of load borne by said rail vehicle.

6. A method for enabling a wheel slip control system that normally controls slip on a per axle basis to control slip on any one of a per axle basis and a per truck basis depending on type of braking equipment with which said method is used, said wheel slip control system for issuing on a per axle basis an axle reduction signal indicative of a percentage by which to reduce braking force applied to a wheel/axle combination of a truck of a rail vehicle, said method comprising the steps of:

(a) converting said axle reduction signals issued on a per axle basis to a truck reduction priority signal indicative of a percentage by which to reduce said braking force on a per truck basis; and (b) commanding dynamic braking equipment to reduce dynamic braking force being applied to said wheel/axle combinations of said truck in response to said percentage carried by said truck reduction priority signal, said dynamic braking equipment employing one of:

(i) a variable control approach according to a variable dynamic braking reduction signal output from step (b) such that said dynamic braking force can range from being applied fully in response to said variable dynamic braking reduction signal having minimum intensity to being released fully in response to said variable dynamic braking reduction signal having maximum intensity; and (ii) an on/off control approach such that a logical dynamic braking reduction signal output from step (b) assumes (A) an enabling state by which to enable dynamic braking of said wheel/axle combinations of said truck if said percentage carried by said truck reduction signal remains below a predetermined threshold value and (B) a disabling state by which to disable dynamic braking of said wheel/axle combinations of said truck if said percentage carried by said truck reduction signal reaches or exceeds said predetermined threshold value.

7. The method as recited in claim 6 further including the steps of:

(a) monitoring said truck reduction priority signal over successive monitoring cycles to determine a rate at which said truck reduction priority signal changes;

(b) selecting from a table of wheel slip control values a valve position value corresponding to said rate of change detected over most recent of said successive monitoring cycles; and (c) commanding a wheel slip control valve independent of friction braking equipment on said truck to assume a particular position corresponding to said valve position value so selected thereby directing said wheel slip control valve to change pressure within a brake cylinder of said friction braking equipment so that said friction braking equipment applies an appropriate amount of friction braking force to said wheel/axle combinations of said truck so as to resolve said slip experienced thereby.

8. The method as recited in claim 6 further including for each of said axle reduction signals the steps of:

(a) monitoring said axle reduction signal over successive monitoring cycles to determine a rate at which said axle reduction signal changes;

(b) selecting from a table of wheel slip control values a valve position value corresponding to said rate of change detected over most recent of said successive monitoring cycles; and (c) commanding a wheel slip control valve connected to friction braking equipment on said wheel/axle combination to assume a particular position corresponding to said valve position value so selected thereby directing said wheel slip control valve to change pressure within a brake cylinder of said friction braking equipment so that said friction braking equipment applies an appropriate amount of friction braking force to said wheel/axle combination so as to resolve said slip experienced thereby.

9. The method as recited in claim 6 further including the step of commanding friction braking equipment to apply an appropriate amount of friction braking force to said wheel/axle combinations of said truck so as to resolve said slip experienced thereby such that said appropriate amount of friction braking force represents a sum of total braking force sought to be applied to said wheel/axle combinations of said truck less first a product of said total braking force and said percentage carried by said truck reduction priority signal and less second said dynamic braking force being applied by said dynamic braking equipment to said wheel/axle combinations of said truck.

10. The method as recited in claim 9 further including the steps of:

(a) monitoring said truck reduction priority signal over successive monitoring cycles to determine a rate at which said truck reduction priority signal changes;

(b) selecting from a table of wheel slip control values a valve position value corresponding to said rate of change detected over most recent of said successive monitoring cycles; and (c) commanding a backup wheel slip control valve to assume a particular position corresponding to said valve position value so selected thereby directing said backup wheel slip control valve to change pressure within a brake cylinder of said friction braking equipment so that said friction braking equipment applies said appropriate amount of friction braking force to said wheel/axle combinations of said truck should said method otherwise fail to so direct said friction braking equipment to so apply said appropriate amount of friction braking force.

11. The method as recited in claim 9 further including for each of said axle reduction signals the steps of:

(a) monitoring said axle reduction signal over successive monitoring cycles to determine a rate at which said axle reduction signal changes;

(b) selecting from a table of wheel slip control values a valve position value corresponding to said rate of change detected over most recent of said successive monitoring cycles; and (c) commanding a backup wheel slip control valve to assume a particular position corresponding to said valve position value so selected thereby directing said backup wheel slip control valve to change pressure within a brake cylinder of said friction braking equipment for said wheel/axle combination so that said friction braking equipment applies said appropriate amount of friction braking force to said wheel/axle combination should said method otherwise fail to so direct said friction braking equipment to so apply said appropriate amount of friction braking force.

12. The method as recited in claim 6 wherein said truck reduction priority signal assumes through said converting step said percentage carried by whichever one of said axle reduction signals has greatest priority as to need for reducing said braking force currently being applied on a per axle basis.

13. The method as recited in claim 9 wherein said total braking force introduced in said commanding step is first formulated to take into account weight of load borne by said rail vehicle.

14. A method for enabling a wheel slip control system that normally controls slip on a per axle basis to control slip on any one of a per axle basis and a per truck basis depending on type of braking equipment with which said method is used, said wheel slip control system for issuing on a per axle basis an axle reduction signal indicative of a percentage by which to reduce braking force applied to a wheel/axle combination of a truck of a rail vehicle, said method comprising the steps of:

(a) converting said axle reduction signals issued on a per axle basis to a truck reduction priority signal indicative of a percentage by which to reduce said braking force on a per truck basis;

(b) deriving a dynamic braking reduction signal through which to reduce dynamic braking force being applied by dynamic braking equipment to said wheel/axle combinations of said truck in response to said percentage carried by said truck reduction priority signal, said dynamic brake reduction signal being:

(i) variable in form when used with said dynamic braking equipment that employs a variable control approach such that said dynamic braking force can range from being applied fully in response to said dynamic braking reduction signal having minimum intensity to released fully in response to said dynamic braking reduction signal having maximum intensity; and (ii) logical in form when used with said dynamic braking equipment that employs an on/off control approach such that said dynamic braking reduction signal assumes (A) an enabling state by which to enable dynamic braking of said wheel/axle combinations of said truck if said percentage carried by said truck reduction signal remains below a predetermined threshold value and (B) a disabling state by which to disable dynamic braking of said wheel/axle combinations of said truck if said percentage carried by said truck reduction signal reaches or exceeds said predetermined threshold value; and (c) deriving a modulation valve control signal through which to direct friction braking equipment to apply an appropriate amount of friction braking force to said wheel/axle combinations of said truck so as to resolve said slip experienced thereby such that said appropriate amount of friction braking force represents a sum of total braking force sought to be applied to said wheel/axle combinations of said truck less first a product of said total braking force and said percentage carried by said truck reduction priority signal and less second said dynamic braking force being applied by said dynamic braking equipment to said wheel/axle combinations of said truck.

15. The method as recited in claim 14 further including the steps of:

(a) monitoring said truck reduction priority signal over successive monitoring cycles to determine a rate at which said truck reduction priority signal changes;

(b) selecting from a table of wheel slip control values a valve position value corresponding to said rate of change detected over most recent of said successive monitoring cycles; and (c) deriving a truck slip control signal through which to command a backup wheel slip control valve to assume a particular position corresponding to said valve position value so selected thereby directing said backup wheel slip control valve to change pressure within a brake cylinder of said friction braking equipment of said truck so that said friction braking equipment applies said appropriate amount of friction braking force to said wheel/axle combinations of said truck should said method otherwise fail to so direct said friction braking equipment to so apply said appropriate amount of friction braking force.

16. The method as recited in claim 14 wherein said truck reduction priority signal assumes through said converting step said percentage carried by whichever one of said axle reduction signals has greatest priority as to need for reducing said braking force currently being applied on a per axle basis.

17. The method as recited in claim 14 wherein said total braking force used in deriving said modulation valve control signal is first formulated to take into account weight of load borne by said rail vehicle.

18. The method as recited in claim 14 further including the steps of:

(a) monitoring said axle reduction signals over successive monitoring cycles to determine for each said axle reduction signal a rate at which said axle reduction signal changes;

(b) selecting for each said axle reduction signal from a table of wheel slip control values a valve position value corresponding to said rate of change detected over most recent of said successive monitoring cycles; and (c) deriving an axle slip control signal for each said axle reduction signal through which to command a backup wheel slip control valve to assume a particular position corresponding to said valve position value so selected thereby directing said backup wheel slip control valve corresponding thereto to change pressure within a brake cylinder of said friction braking equipment for said wheel/axle combination so that said friction braking equipment applies said appropriate amount of friction braking force to said wheel/axle combination should said method otherwise fail to so direct said friction braking equipment to so apply said appropriate amount of friction braking force.

19. A method for enabling a wheel slip control system that normally controls slip on a per axle basis to control slip on any one of a per axle basis and a per truck basis depending on type of braking equipment with which said method is used, said wheel slip control system for issuing on a per axle basis an axle reduction signal indicative of a percentage by which to reduce braking force applied to a wheel/axle combination of a truck of a rail vehicle, said method comprising the steps of:

(a) converting said axle reduction signals issued on a per axle basis to a truck reduction priority signal indicative of a percentage by which to reduce said braking force on a per truck basis;

(b) for rail vehicles featuring dynamic braking equipment, commanding said dynamic braking equipment to reduce dynamic braking force being applied to said wheel/axle combinations of said truck in response to said percentage carried by said truck reduction priority signal;

(c) for rail vehicles featuring friction braking equipment through which slip can be controlled on a per truck basis, commanding said friction braking equipment to apply an appropriate amount of friction braking force to said wheel/axle combinations of said truck so as to resolve slip experienced thereby such that said appropriate amount of friction braking force represents a sum of total braking force sought to be applied to said wheel/axle combinations of said truck less first a product of said total braking force and said percentage carried by said truck reduction priority signal and, for said rail vehicles featuring said dynamic braking equipment, less second said dynamic braking force being applied to said wheel/axle combinations of said truck;

(d) for rail vehicles featuring truck friction braking equipment that lacks ability to control slip but applies friction braking force on a per truck basis and regardless of whether said rail vehicles feature said dynamic braking equipment:

(i) monitoring said truck reduction priority signal over successive monitoring cycles to determine a rate at which said truck reduction priority signal changes;

(ii) selecting from a table of truck slip control values a valve position value corresponding to said rate of change detected over most recent of said successive monitoring cycles; and (iii) commanding a truck slip control valve connected to said truck friction braking equipment on said truck to assume a particular position corresponding to said valve position value so selected thereby directing said truck slip control valve to change pressure within a brake cylinder of said truck friction braking equipment so that said truck friction braking equipment applies a necessary amount of friction braking force to said wheel/axle combinations of said truck so as to resolve said slip experienced thereby;

(e) for rail vehicles featuring axle friction braking equipment that lacks ability to control slip but applies friction braking force on a per axle basis and regardless of whether said rail vehicles feature said dynamic braking equipment, for each of said axle reduction signals:

(i) monitoring said axle reduction signal over successive monitoring cycles to determine a rate at which said axle reduction signal changes;

(ii) selecting from a table of axle slip control values a valve position value corresponding to said rate of change detected over most recent of said successive monitoring cycles; and (iii) commanding an axle slip control valve connected to said axle friction braking equipment on said wheel/axle combination to assume a particular position corresponding to said valve position value so selected thereby directing said axle slip control valve to change pressure within a brake cylinder of said axle friction braking equipment so that said axle friction braking equipment applies a requisite amount of friction braking force to said wheel/axle combination so as to resolve said slip experienced thereby;

(f) for rail vehicles that may optionally include a backup truck slip control valve as backup on a per truck basis to said friction braking equipment described in step (c), the following substeps should be performed if said friction braking equipment otherwise fails to so apply said appropriate amount of friction braking force:

(i) monitoring said truck reduction priority signal over successive monitoring cycles to determine a rate at which said truck reduction priority signal changes;

(ii) selecting from a truck wheel slip table a valve position value corresponding to said rate of change detected over most recent of said successive monitoring cycles; and (iii) commanding said backup truck slip control valve to assume a particular position corresponding to said valve position value so selected thereby directing said backup truck slip control valve to change pressure within a brake cylinder of said friction braking equipment so that said friction braking equipment applies said appropriate amount of friction braking force to said wheel/axle combinations of said truck; and (g) for rail vehicles that may optionally include a backup axle slip control valve as backup on a per axle basis to said friction braking equipment described in step (c), the following substeps should be performed for each of said axle reduction signals if said friction braking equipment otherwise fails to so apply said appropriate amount of friction braking force:

(a) monitoring said axle reduction signal over successive monitoring cycles to determine a rate at which said axle reduction signal changes;

(b) selecting from an axle wheel slip table a valve position value corresponding to said rate of change detected over most recent of said successive monitoring cycles; and (c) commanding said backup axle slip control valve to assume a particular position corresponding to said valve position value so selected thereby directing said backup axle slip control valve to change pressure within a brake cylinder of said friction braking equipment for said wheel/axle combination so that said friction braking equipment applies said appropriate amount of friction braking force to said wheel/axle combination.

20. The method as recited in claim 19 wherein said truck reduction priority signal assumes through said converting step said percentage carried by whichever one of said axle reduction signals has greatest priority as to need for reducing said braking force currently being applied on a per axle basis.

21. The method as recited in claim 19 wherein said dynamic braking equipment employs a variable control approach according to a variable dynamic braking reduction signal output from step (b) such that said dynamic braking force can range from being applied fully in response to said variable dynamic braking reduction signal having minimum intensity to being released fully in response to said variable dynamic braking reduction signal having maximum intensity.

22. The method as recited in claim 19 wherein said dynamic braking equipment employs an on/off control approach such that a logical dynamic braking reduction signal output from step (b) assumes (i) an enabling state by which to enable dynamic braking of said wheel/axle combinations of said truck if said percentage carried by said truck reduction signal remains below a predetermined threshold value and (ii) a disabling state by which to disable dynamic braking of said wheel/axle combinations of said truck if said percentage carried by said truck reduction signal reaches or exceeds said predetermined threshold value.

23. The method as recited in claim 19 wherein said total braking force introduced in step (c) is first formulated to take into account weight of load borne by said rail vehicle.

* * * * *